United States Patent
Smolarek et al.

(10) Patent No.: US 6,253,778 B1
(45) Date of Patent: Jul. 3, 2001

(54) ROTARY VALVE

(75) Inventors: James Smolarek, Boston; Leslie Charles Kun, Williamsville, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/195,411

(22) Filed: Nov. 19, 1998

(51) Int. Cl.[7] .................................................. F16K 11/20
(52) U.S. Cl. ............................... 137/1; 137/594; 251/172
(58) Field of Search ............................. 137/115.16, 595, 137/597, 625.47, 876, 594, 1; 251/172

(56) References Cited

U.S. PATENT DOCUMENTS

| | | | |
|---|---|---|---|
| 848,536 | 3/1907 | Cosper . | |
| 1,052,938 | * 2/1913 | McKeen | 137/594 |
| 1,828,175 | * 10/1931 | Crosby | 137/594 |
| 2,312,941 | 3/1943 | Tucker | 251/98 |
| 2,332,882 | * 10/1943 | Abbatiello | 137/625.47 |
| 2,751,032 | 6/1956 | Ringo et al. | 96/124 |
| 3,329,166 | 7/1967 | Kiernan | 137/625.16 |
| 3,334,658 | 8/1967 | Kaatz | 137/630.16 |
| 3,489,178 | 1/1970 | Kice | 137/625.41 |
| 3,889,712 | 6/1975 | Fields | 137/625.47 |
| 4,038,054 | 7/1977 | Graff | 96/124 |
| 4,272,265 | 6/1981 | Snyder | 96/124 X |
| 4,312,372 | * 1/1982 | Amos et al. | 137/625.47 |
| 4,469,494 | 9/1984 | Van Weenen | 96/124 |
| 4,925,464 | 5/1990 | Rabenau et al. | 96/124 |
| 4,979,756 | * 12/1990 | Krambrock et al. | 251/172 |
| 5,114,440 | 5/1992 | Reiss | 55/25 |
| 5,114,441 | 5/1992 | Kanner et al. | 55/26 |
| 5,122,164 | 6/1992 | Hirooka et al. | 55/26 |
| 5,223,004 | 6/1993 | Eteve et al. | 55/26 |
| 5,256,174 | 10/1993 | Kai et al. | 96/124 X |
| 5,429,669 | 7/1995 | Agrawal et al. | 95/101 |
| 5,549,733 | 8/1996 | Marot et al. | 55/25 |
| 5,584,322 | 12/1996 | Pöschl et al. | 96/124 X |
| 5,593,480 | 1/1997 | Pöschl et al. | 96/124 |
| 5,632,804 | 5/1997 | Schwartz | 96/130 X |
| 5,807,423 | 9/1998 | Lemcoff et al. | 96/124 X |
| 5,814,130 | 9/1998 | Lemcoff et al. | 96/124 X |
| 5,814,131 | 9/1998 | Lemcoff et al. | 96/124 X |
| 5,820,656 | 10/1998 | Lemcoff et al. | 96/124 X |
| 5,906,224 | * 5/1999 | Tupper et al. | 137/625.47 |

FOREIGN PATENT DOCUMENTS 2033777   5/1980   (GB) ...................................... 96/124

* cited by examiner

*Primary Examiner*—Stephen M. Hepperle
(74) *Attorney, Agent, or Firm*—Robert J. Follett

(57) ABSTRACT

The invention comprises a rotary valve having first and second inlet/outlet flow passages, as well as one or more (preferably between 6 and 8) flow ports. The valve has a plurality of positions simultaneously interconnecting the first and second flow passage to selected flow ports. In a preferred embodiment, the valve has a housing and the flow ports are disposed on outer peripheral walls of the housing. The valve may further include an internal rotary plug that is rotatable about a longitudinal axis to move between the positions, and containing openings to connect the flow passages to the flow ports. The plug may be divided into two chambers in the valve which may or may not be moved independently of each other. The valve may further include a movable seal between the housing and the internal plug member which is retractable to permit freer movement of the plug.

13 Claims, 5 Drawing Sheets

ROTARY VALVE

FIELD OF THE INVENTION

The invention relates to valves for use in industrial processes.

More particularly, the invention relates to valves having multiple inlet and outlet ports.

More particularly the invention relates to a rotary valve having three or more ports.

BACKGROUND OF THE INVENTION

Many industrial processes require the use of valves for the cycling of flow streams. Such processes include drying, adsorption, gas sweetening and fume incineration. These processes generally employ some type of fluid moving equipment such as pumps, blowers and/or compressors as well as the numerous valves necessary to direct the gas flow to the appropriate vessel at the appropriate time.

The selection of appropriate valves for cyclic processes depends upon a number of criteria. These include flow, operating and sealing characteristics, port configuration, physical size, energy input (e.g. electrical, hydraulic or pneumatic) and cost. Because such processes typically employ relatively low pressures (e.g. in the range of 1 psia to 100 psia), large volumetric flows result. In such situations, it is therefore necessary to have an accompanying low pressure drop, on the order of 0.05 psi to 2 psi.

Valve operating characteristics include quick opening and closing times, on the order of 0.25 to 2 seconds. Sealing characteristics include the type of seal, the mating surfaces, and the power required to open and close the valve to prevent any leakage during the full-closed position. As to port configuration, it is noted that a majority of valves handle a single fluid, and consequently these have one port for entry of fluid and one port for exiting of fluid.

Multiples of this type of valve have long been used for the control of cyclic processes, as given their nature, numerous valves are required. It is necessary to interconnect these valves thus requiring extensive interconnecting piping. In order to maintain a low pressure drop with the use of dual valves, relatively large valve sizes are required (e.g. greater than 10 inches in diameter), resulting in relatively slow open/close times and high costs.

Kice, in U.S. Pat. No. 3,489,178 teaches a valve design with both inlet and outlet directions perpendicular to the axis of rotation. This design does not utilize a large portion of the outer diameter of the valve, thus requiring a valve of increased size and cost.

Tucker, in U.S. Pat. No. 2,312,941 teaches a valve having very small clearances to seal the ports having different pressures. This requires an oversized valve body at additional expense. Further, the inertia associated with the thick walled valve drum causes an increase in valve response time and consequently excessive operating costs.

Thus, there is a need in the art to improve valve design to more nearly meet all of the criteria for cyclic service.

OBJECTS OF THE INVENTION

It is therefore an object of the invention to provide a valve design that is useful in cyclic processes.

It is a further object of the invention to provide a valve that has a relatively low pressure drop when used in low pressure applications.

It is a further object of the invention to provide a valve that is multi-ported so as to minimize the amount of piping required for cyclical processes.

SUMMARY OF THE INVENTION

The invention comprises a rotary valve having first and second inlet/outlet flow passages, as well as one or more (preferably between 6 and 8) flow ports. The valve has a plurality of positions simultaneously interconnecting the first and second flow passage to selected flow ports. Thus the valve in a first position may be adapted to connect a first or second flow passage and a first flow port and the valve in a second position may be adapted to connect a first or second flow passage and a second flow port. As is readily apparent, numerous positions are possible for connecting flow passages to flow ports, with the number increasing with the number of flow ports.

In a preferred embodiment, the valve has a housing and the flow ports are disposed on outer peripheral walls of the housing. The valve may further include an internal rotary plug that is rotatable about a longitudinal axis to move between the positions, and containing openings or passages to connect the flow passages to the flow ports.

The plug may be divided into two chambers within the valve, with one of the chambers corresponding to a first valve portion, and the other of the chambers corresponding to a second valve portion. Each of the chambers may be moved independently of each other, or may be connected to each other and moved together.

The valve may further include a movable seal between the housing and the internal plug member which is retractable to permit free movement of the plug between the positions.

BRIEF DESCRIPTION OF THE DRAWINGS

Other objects, features and advantages will occur to those skilled in the art from the following description of the preferred embodiments and the accompanying drawings, in which.

DETAILED DESCRIPTION OF THE INVENTION

The subject invention provides the design of a valve suitable for operation in cyclic service. The inventive valve has a low pressure drop (measured from the entrance of the inlet ports 3a or 3b (hereafter discussed) to the exits of the discharge ports C–J hereafter discussed)) of less than 0.5 psi, preferably less than 0.2 psi when used in low pressure service (e.g. less than 30 psia). The valve may be designed for flows as small as 500 cfm or as large as 100,000 cfm without unduly limiting its physical parts. Further, because the inventive valve is multi-ported, the amount of interconnecting piping in the system into which the valve is incorporated is minimized. Indeed, the number of ports in the design is limited only by the size of the ports and the physical space available on the outer periphery of the body of the valve. Thus, three, four or more ports may be incorporated in the design of each chamber of the valve. The ports may be provided with a manifold external to the valve in any manner desired.

Figure 1:
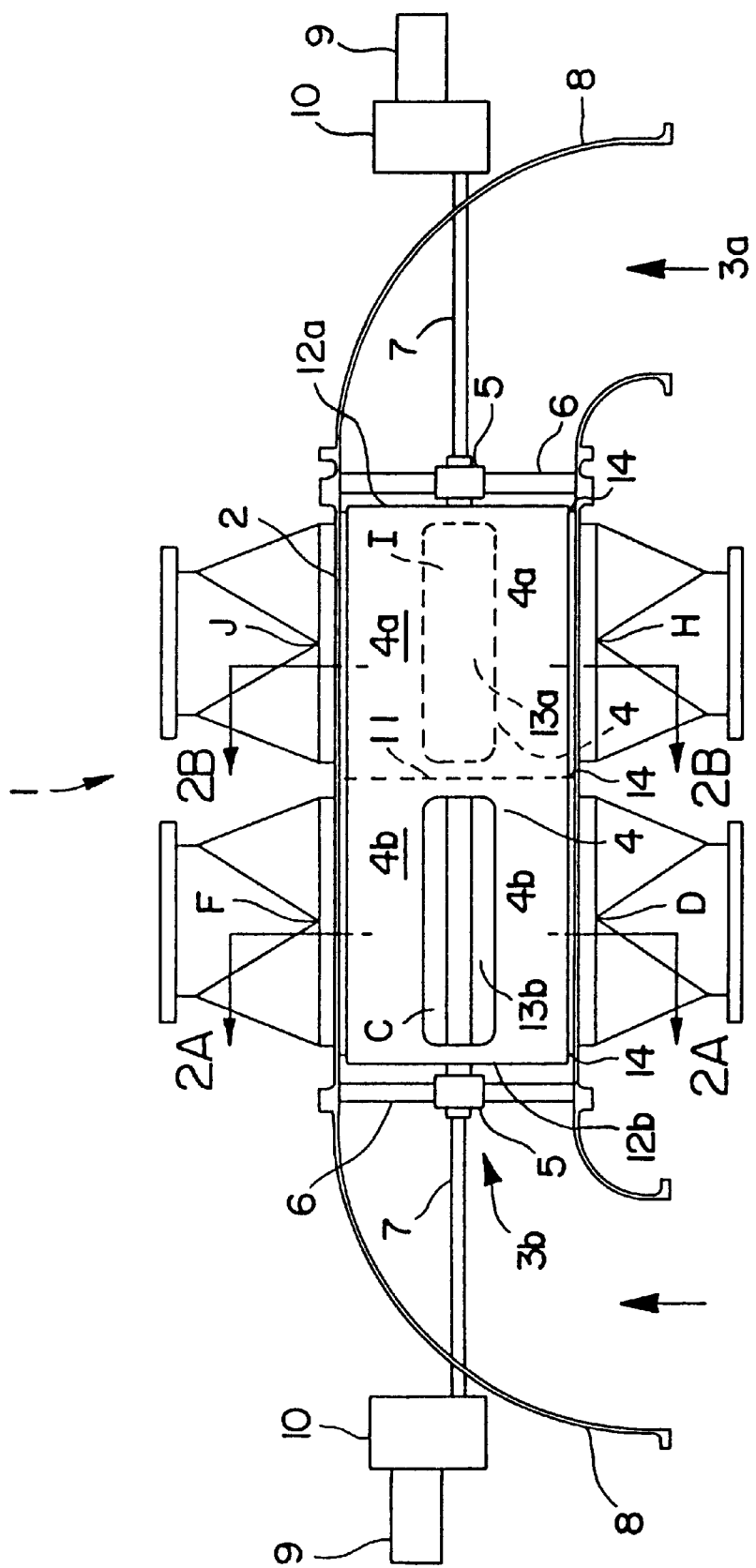
FIG. 1 is a schematic diagram of one rotary valve contemplated by the invention.

A mechanical schematic of the rotary control valve 1 is shown in FIG. 1. The outside valve case structure (e.g. the housing) of the valve body 2 is cylindrical and contains a plurality of flow (discharge) ports C–J; (E and G are not shown) along its outer periphery. The outside case structure 2 is less than 0.3 inches thick preferably less than 0.2 inches thick. The valve has two inlet/outlet passages, 3a and 3b at opposite ends of the valve body. The inlet/outlet passages are interchangeable.

Plug 4 is a relatively thin-walled drum (e.g. the wall is less than about 0.2 inches thick, preferably less than 0.1 inches thick). The benefit of the thin wall is that the valve has a relatively low mass. This permits operation at high speed (i.e. less than 1 seconds per port change, or even less than 0.5 second per port change).

The plug should be constructed materials having relatively low weight, high tensile strength and a high Young's modulus. Examples of such materials are high strength steel, aluminum or carbon fiber.

The plug(s) 4 is supported by bearings 5 centered at the opposite ends of the valve body. The bearings, in turn, are supported by struts 6 which extend to the inner surface of valve casing 2. The control shaft 7 of the plug extends through the two ends of the valve so that plug 4 may be positioned by rotation of the shaft. One or both ends of valve casing 2 may be fitted with a piping elbow 8 through which the shaft of the plug may be extended for ease of attachment of a pneumatic or hydraulic control mechanism, such as a servo motor or other means 9, driving through gear box 10. The operation of the plug may be computer programmed to function in any desired sequence.

The center of the plug 4 may be partitioned by at least one partition 11 so as to form two or more cylindrical chambers (4a and 4b) to permit the processing of two or more separate streams. The plug may be designed such that the chambers operate independently or in unison. The plug 4a has an opening 12a at its end facing inlet 3a and, in internal communication therewith, an opening 13a on its outer periphery. Similarly, the plug 4b has an opening 12b at its end facing feed air inlet 3b and, in internal communication therewith, an opening 13b on its outer periphery. Upon rotation of the plug(s) 4a, 4b, the outer openings 13a, 13b may be indexed into alignment with a desired port (C–J) for flow of vacuum and/or feed air to the system component in communication with the port.

A seal 14, to be discussed later, is provided to prevent leakage and to minimize the torque necessary to operate the plug. The design of the seal also minimizes the wear of the seal.

As shown, there are two inlet ports, one (3b)through the elbow 8 and the other through the opposite end of the valve at 3a. Two sets of four discharge ports are attached to valve casing 2. This view shows the position of discharge ports D, F, H, and J (with C and I facing out of the page). Not seen in this view are ports E and G (which are opposite ports C and I). However, the operation of the valve is shown in position to permit flow through port C and port I. Thus the flow of fluid through the valve is such that the fluid enters the valve body axially (through inlets 3a and/or 3b), and exits through the ports (C–J) radially. Circumferential seals 14, along with longitudinal seals 15 (see FIG. 2), surround each opening in plug 2 to assure leak-tight operation.

Figure 2B:
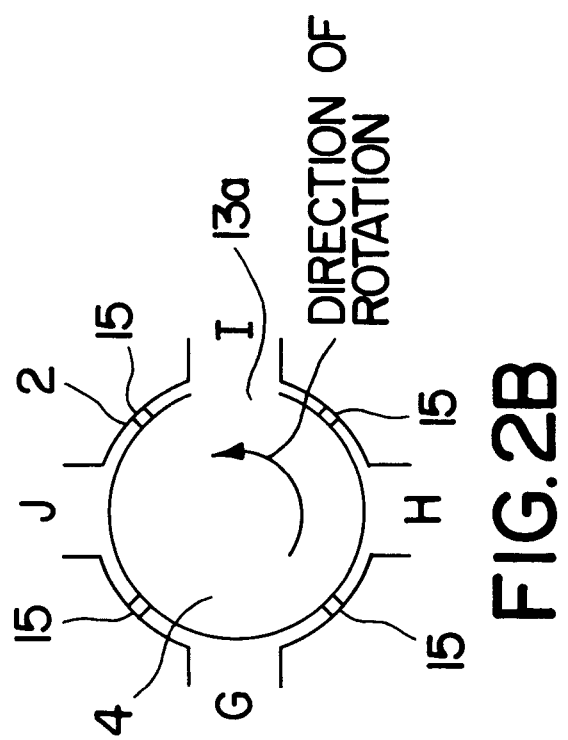
FIG. 2 illustrates two-cross sections of one multi-ported valve of the invention.
Figure 2A:
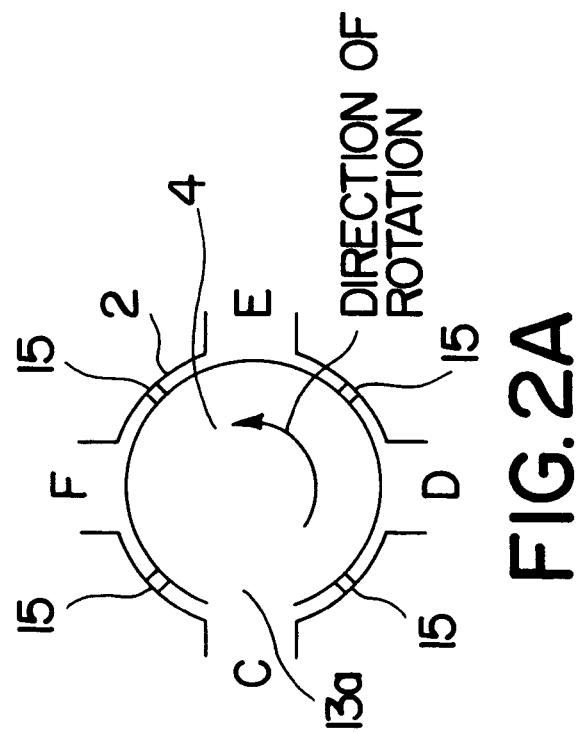

FIG. 2 shows two cross-sectional views of the valve in FIG. 1. Note that in FIGS. 2–5 common reference numbers and letters to those used in FIG. 1 indicate common features. This example of an inventive rotary valve contains two sets of four ports positioned 90 degrees apart with a common inlet/outlet port. The multi-ported rotary valve has a cylindrical casing 2 containing a matching hollow cylindrical plug 4. The valve casing 1 contains a number of ports C, D, E, F, and G, H, I, and J to which piping flanges are attached. The plug is fabricated with openings (13a) which correspond identically to the ports in the valve body. The plug can be rotated around a central axis. The rotation of the plug is shown to be counterclockwise, however, the rotation may be either clockwise or counterclockwise in any sequence as required. This figure also shows the positions of longitudinal seals 17.

Figure 3:
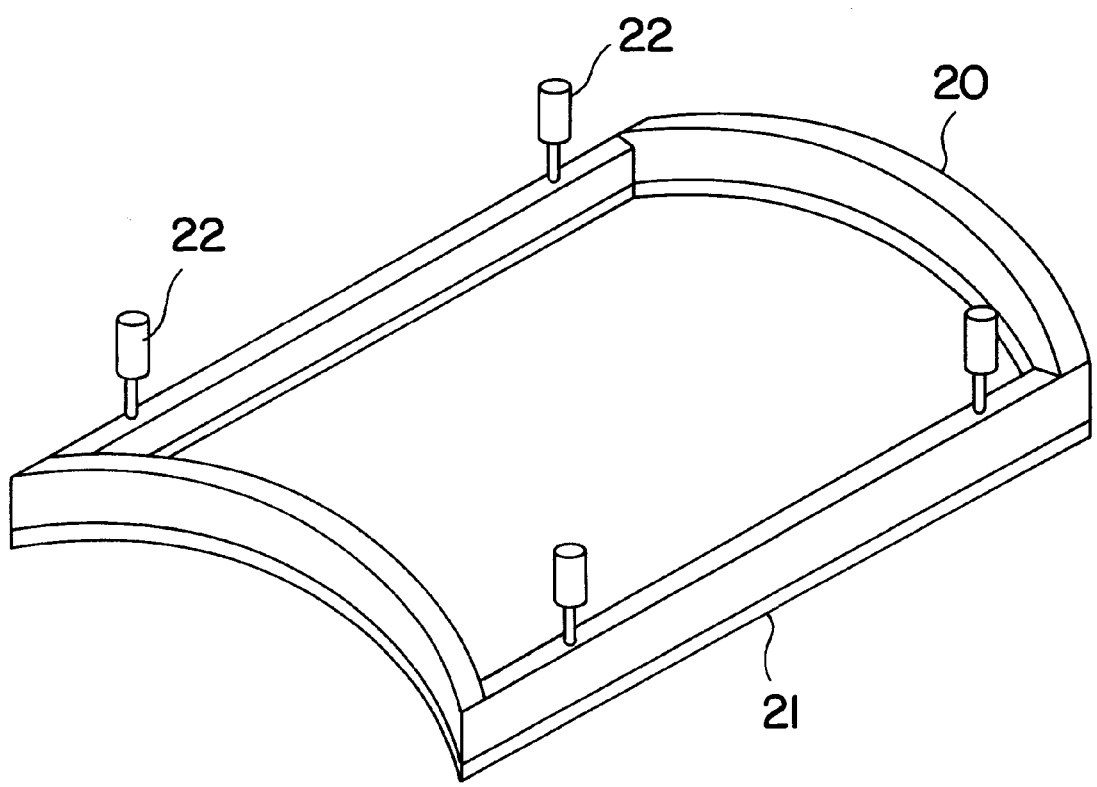
FIG. 3 is a schematic diagram of a valve seal used in a rotary valve of the invention.

The design of the seals of this valve resolves a difficult problem in the art. In addition to the typical problems of wear, ease of operation, and action speed, there is also the problem of distortion of the thin-walled plug. In order to address this problem, a unique seal has been developed for the inventive rotary valve. This is shown in FIG. 3.

As illustrated therein, a relatively stiff seal frame 20 is provided with a relatively soft seal 21. The seal assembly must accommodate at most a 0.25 inch total deflection, with preferably about a 0.125 inch defection between the outer casing and inner drum. The seal frame is made of steel with flexible rubber or TEFLON® fluoro polymer trip seals. This assembly is placed inside of the valve ports of the valve body. Pneumatic cylinder actuators 22 retract the seal assembly before rotation of the valve drum begins and extend it after the rotation stops. In this manner not only is a positive seal provided with enough flexibility to follow the distortion of the drum, but the substantial wear of the seal is also prevented by eliminating the sliding wear between seal 21 and valve drum 2. Action of the plug is accelerated because there is no friction between the valve body and plug during the movement of the plug. Another significant advantage of this design is that it minimizes the seal perimeter, and consequently the leakage area through the seal. The material for the seal should have excellent durability, sealability and formability. Examples of such materials include VITON® rubber, TEFLON® or urethane.

Figure 4:
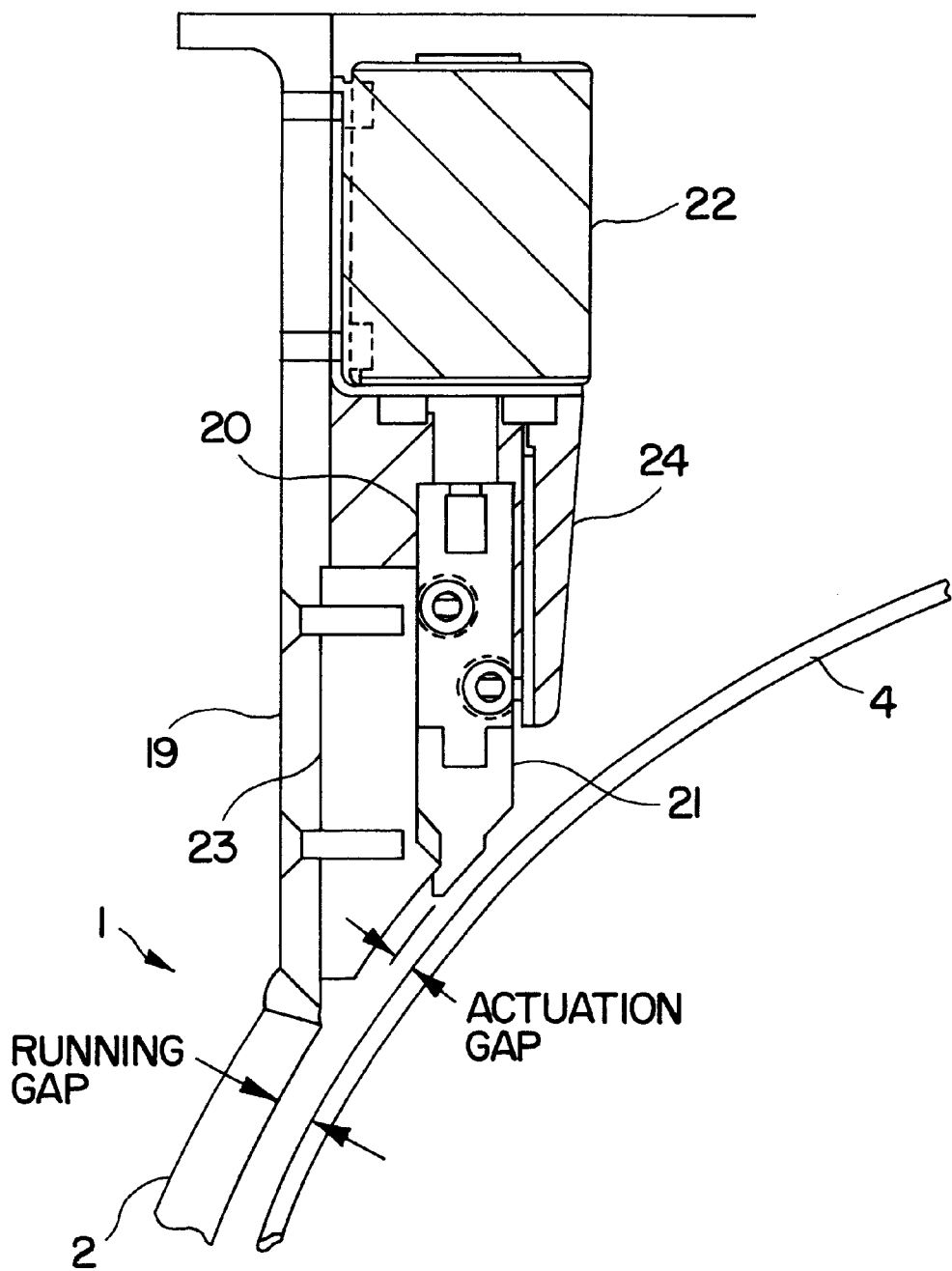
FIG. 4 is a schematic diagram of a valve seal actuator useful in the practice of the invention.

The equipment used for the operation of the seal activation system is shown in FIG. 4. A cross section of the valve body is shown as item 1 to which the cylinder valve actuator 22 is secured. The actuator 22 may be pneumatic or hydraulic. Cylinder actuator 22 and the outer guide 23 are either welded or bolted to the nozzle 19. The outer guide 23 and the inner guide 24 define the direction of the path of the reciprocating motion of the seal frame 20 and the seal 21. Sealing occurs between the seal 21 and the valve drum (plug) 2 and between the seal 21 and the outer guide 23. The sealing face 21 of the seal may be smooth or may be provided with labyrinth type grooves for improved operation. The actuation gap between the open seal and the plug is typically on the order of about 0.5 inches to about 0.1 inches, preferably about 0.25 inches, more preferably about 0.125 inches. The running gap between the outer wall of the plug and the inner wall of the casing is typically on the order of about 0.5 inches to about 0.1 inches, preferably about 0.25 inches, and more preferably 0.125 inches.

The design of this valve permits severe repetitive service wherein wear characteristics are extremely important. The low mass plug design along with the non-scuff feature permits rapid valve action (on the order of less than 0.5 seconds), very short cycle times (e.g. between 1.0 seconds and 0.1 seconds, preferably 0.2 seconds to 0.6 seconds, and most preferably 0.3 seconds to 0.5 seconds) and low maintenance. In practice the high frequency of operation and positive positioning demand a seal design with essentially no scuffing, sliding or bearing against the valve body. The valve of the invention possesses all of these features.

Figure 5:
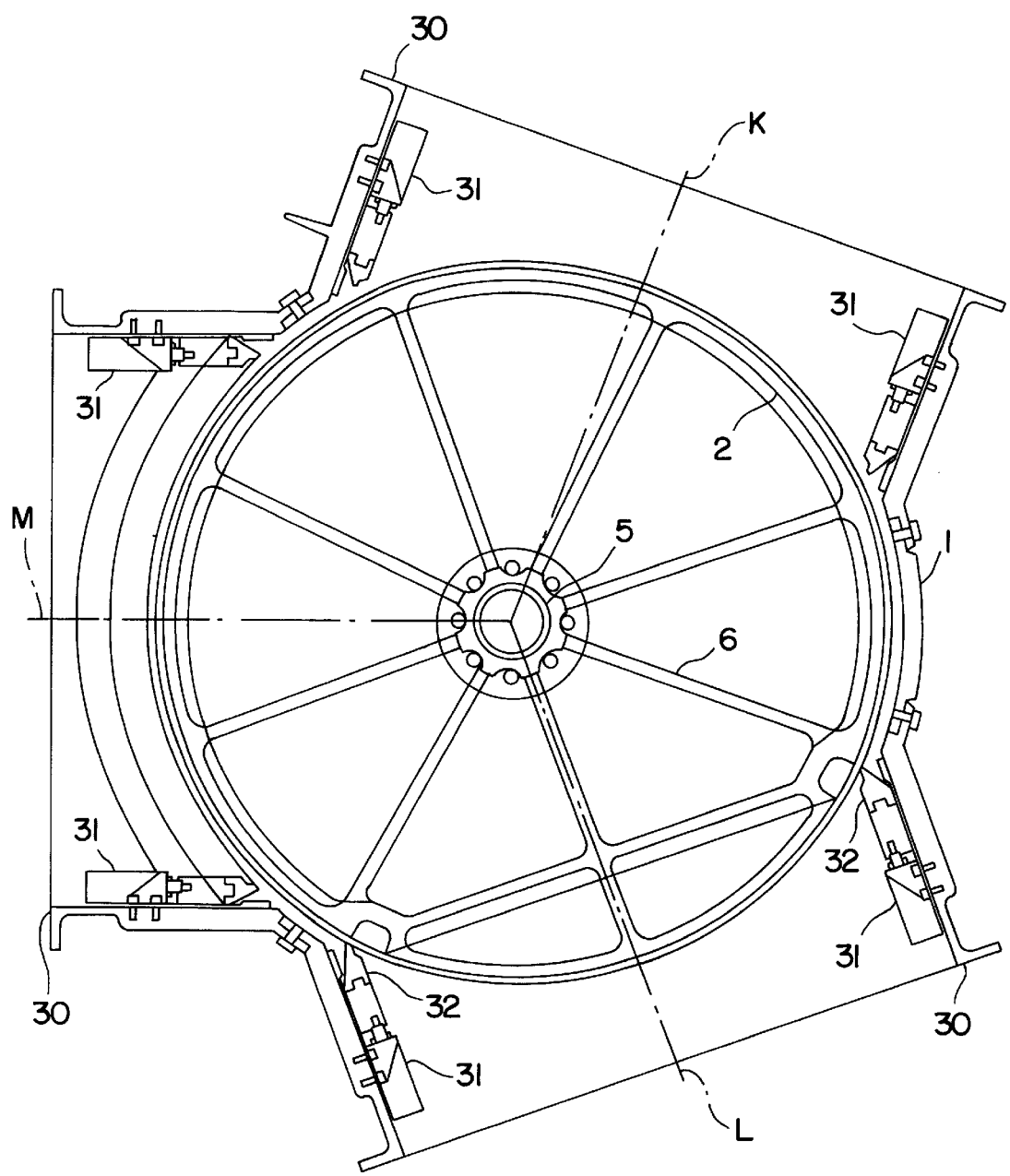
FIG. 5 is a cross section view of a three port rotary valve of the invention.

There are a number of variations that can be incorporated into the above disclosed design. For example, the design can be applied valves having three or more ports. FIG. 5 shows a design wherein the axial flow path is channeled into any of the three openings in the outer diameter of the valve body 1. The plug 2 of the valve can be designed as a single rotating element, or can be designed as two independently acting axial plugs, each operated by its own actuator.

Further, the direction of the rotation of the plugs may be clockwise, counterclockwise or any combination of clockwise and counterclockwise rotation. The three ports of the valve, K, L, and M, including the piping flange 30, may be manifolded together in any fashion as required by the particular processing scheme. The spacing and size of the ports are typically determined by the needs of the process, but typically may range from 50 inches$^2$ to 2000 inches$^2$.

Referring again to FIG. 5, the plug 2 is supported by struts 7 and bearing 4. The opening in plug 2 is shown facing port L, with valve seals 32 (corresponding to seals 21 in FIG. 4) in the sealed position. The valve seal actuator 31 (corresponding to actuator 22 in FIG. 4) positions the seals 32 in response to the control mechanism. The control of the operation of plug 2 may be pneumatic, hydraulic, or by motor through gears.

For those skilled in the art striving to reduce both the cost of the system as well as its operating cost, the merits of this invention are clear. The system cost will be lowered by the reduction of the number of valves, actuators and by the simplification of the interconnecting piping.

We have also found that there is a relationship between the cost of the driving motor and gearbox, the minimum cycle time necessary to reduce losses, and the sealing requirements. In particular, if the wall of the drum is kept relatively thin to reduce its inertia, large deflections will result when the assembly is subjected to the working pressure. The thickness of the wall of the valve drum 2 (FIG. 1) will be distorted and the shaft 3 (FIG. 1) deflected from its original position. Increasing the wall thickness and shaft diameter, of course, will reduce the deflections but will also increase the driver cost significantly and/or increase the cycle time. On the whole, we have found that the preferred valve drum wall thickness is less than 10 per cent of the valve diameter, with the preferable range being 0.5 to 5 per cent.

The valve of the invention may be used in many different applications, including air separation, air pre-purification and gas (i.e. $CO_2$, $H_2$ and Ar) purification. A preferred use is in a pressure swing adsorption (PSA) system for the production of oxygen. Such a system could have a capacity in the range of 100 to 400 tons per day of oxygen. In general, valve sizes could range from a nominal diameter of 12 inches up to 48 inches, and a port length ranging from 12 inches to 60 inches. A preferred PSA process is disclosed in co-filed, commonly assigned application U.S. Ser. No. 09/195,412, the contents of which are herein incorporated by reference.

It should be understood that the foregoing description is only illustrative of the invention. Various alternatives, modifications, and other process conditions (e.g., operating pressure ranges) can be devised by those skilled in the art without departing from the invention.

What is claimed is:

1. An air separation process using a rotary valve, said process comprising flowing a feed stream through a cylindrical rotary valve having first and second inlet flow passages on each end of said valve, first and second outlet flow passages on the sides of said valve and one or more outlet flow ports, wherein said valve has a plurality of positions simultaneously interconnecting the first and second outlet flow passages to selected outlet flow ports, wherein said valve further comprises an internal rotary plug that is rotatable about a longitudinal axis to move between said positions, and containing openings to connect said inlet flow passages to said outlet flow passages, and wherein said plug is divided into two chambers, each of which may be moved independently of each other, wherein the valve has a housing and the flow ports disposed on outer peripheral walls of said housing, and wherein said feed stream enters said first and second inlet flow passages, flows in an axial direction and exits radially through said outlet flow passages.

2. The process of claim 1, wherein said valve further comprises a retractable seal between said housing and said internal plug member.

3. The process of claim 2, wherein said seal is in contact with said plug only when said plug is not rotating.

4. The process of claim 1, wherein said plug is supported on either side of said valve by bearings.

5. The process of claim 1, wherein there is a gap between said housing and said plug.

6. The process of claim 1, further comprising an actuator that controls the rotation of the plug.

7. The process of claim 1, wherein the thickness of the wall of said plug is less than 10% of the diameter of said valve.

8. The process of claim 1, wherein the thickness of the wall of said plug is from 0.5% to 5% of the diameter of said valve.

9. The process of claim 1, wherein the plug is constructed of high strength steel, aluminum or carbon fiber.

10. The process of claim 1, wherein the wall of said housing has a thickness of 0.3 inches.

11. The process of claim 1, wherein there is a gap between the outer wall of the plug and the inner wall of the housing and said gap is less than 0.5 inches.

12. The process of claim 1, wherein there is a gap between the outer wall of the plug and the inner wall of the housing and the gap is less than 0.125 inches.

13. The process of claim 1, wherein said seal is comprised of VITON® rubber, TEFLON® fluoropolymer or urethane.

* * * * *